United States Patent [19]

Doster et al.

[11] Patent Number: 5,146,806
[45] Date of Patent: Sep. 15, 1992

[54] SHIFTING ARRANGEMENT FOR A GEAR WHEEL CHANGE BOX OF A MOTOR VEHICLE

[75] Inventors: Klaus Doster, Frickenhausen; Hubert Mueller, Tiefenbronn, both of Fed. Rep. of Germany

[73] Assignee: Dr. Ing. h.c.F. Porsche AG, Fed. Rep. of Germany

[21] Appl. No.: 578,786

[22] Filed: Sep. 7, 1990

[30] Foreign Application Priority Data

Sep. 7, 1989 [DE] Fed. Rep. of Germany ....... 3929678

[51] Int. Cl.$^5$ .............................................. G05G 9/12
[52] U.S. Cl. ........................................ 74/477; 74/475; 74/527; 74/337.5
[58] Field of Search ................. 74/377.5, 477, 475, 74/473 R

[56] References Cited

U.S. PATENT DOCUMENTS

| | | |
|---|---|---|
| 1,880,064 | 9/1932 | Ahlm . |
| 2,175,449 | 10/1939 | Stanard ........................... 74/477 |
| 3,115,047 | 12/1963 | Lunn et al. ...................... 74/477 |
| 3,238,807 | 3/1966 | Hetmann ......................... 74/477 |
| 3,264,895 | 8/1966 | Turunen .......................... 74/477 |
| 3,677,105 | 7/1972 | Dence ............................. 74/477 |
| 4,197,760 | 4/1980 | Wolfe .............................. 74/477 |
| 4,432,251 | 2/1984 | Malott ............................. 74/477 |
| 4,531,418 | 7/1985 | Takahasi et al. ................. 74/477 |

FOREIGN PATENT DOCUMENTS

| | | |
|---|---|---|
| 0117341 | 9/1984 | European Pat. Off. . |
| 3125632 | 12/1982 | Fed. Rep. of Germany . |
| 3827571A1 | 3/1990 | Fed. Rep. of Germany . |
| 2433430 | 7/1990 | France . |

OTHER PUBLICATIONS

Sport Auto, Apr. 1988, Die Passat-Technik im Detail.
European Search Report.

*Primary Examiner*—David A. Scherbel
*Assistant Examiner*—Winnie Yip
*Attorney, Agent, or Firm*—Evenson, Wands, Edwards, Lenahan & McKeown

[57] ABSTRACT

A rotatable and longitudinally shiftable piece in a motor vehicle gear wheel change box interacts with three abutting shift rails. The longitudinal displacement of one shift rail blocks the two other shift rails. A spring engages in all shift rails in a form-fitting and elastic manner and locks them with respect to one another and with respect to the gearbox in the center position and in the respective left or right shifting position.

16 Claims, 4 Drawing Sheets

SHIFTING ARRANGEMENT FOR A GEAR WHEEL CHANGE BOX OF A MOTOR VEHICLE

BACKGROUND AND SUMMARY OF INVENTION

The present invention relates to a shifting arrangement for a synchronized gear wheel change box of a motor vehicle, and, more particularly, to a shifting arrangement which provides simple and low-cost locking of shift rails with respect to each other and to the gearbox.

An actuating arrangement for a gear wheel change box is described in the journal, *Sport Auto*, Apr. 1988, Page 127. The gear speeds are preselected by a first Bowden cable actuated by a gear shift lever. The individual gear speeds are shifted by a second Bowden cable by way of shift forks and synchronizer clutches. An actuating arrangement, as shown in DE-PS 31 25 632, is used as a connection from the shift forks to the preselector shaft and the shifting shaft actuated by the Bowden cables. The shifting shaft is provided with a radially projecting shift finger which engages in recesses of shift rails forming shifting paths. The shift rails operatively associated with the shift forks can be moved transversely with respect to the shifting shaft. The gear speeds are preselected by displacing the shift finger in the axial direction of the shifting shaft. The gear speeds can be shifted by the swivelling of the shift finger. The shift rails situated next to the selected shifting path are each blocked by cams which are constructed in one piece with the shift finger and, from the inside, rest against circular-arc-shaped wall parts of the shift rails.

In order to implement a precise shifting, it is also necessary, however, precisely to guide the respective shift rail to be actuated during the shifting operation and to lock the shift rail in the respective shifting position.

It is, therefore, an object of the present invention to provide a simple locking arrangement at low cost and, through which, all shift rails can be locked with respect to one another and with respect to the gearbox.

The foregoing objects have been achieved in accordance with the present invention by locking respective shifting positions of the shift rails by a spring which form-fittingly and elastically engages in all the shift rails. Since the spring is non-displaceably fastened to the gearbox or to a component rigidly connected therewith, the mutual position of the shift rails and their position with respect to the gearbox is clearly established.

Another advantageous feature of the present invention is the spring having a U-shaped cross-section, in a tong-like manner with U-legs. The spring reaches around the top and bottom surfaces of the shift rails, and beads at the ends of the U-legs, engage in corresponding indentations of the shift rails. Advantageously, the indentations are each situated on two cam elevations respectively mounted on the shift rails and determine a neutral center position, a left shifting position and a right shifting position. The indentations and cam elevations at the holding rails may be punched out together with a V-recess. The stop cams of a shifting piece rest against the V recess. When a shift rail with the shift finger of the shifting piece is brought into a left or right shifting position, the spring lifts off the other shift rails during this shifting operation. However, these shift rails are locked because the stop cams rest against their V-recesses.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
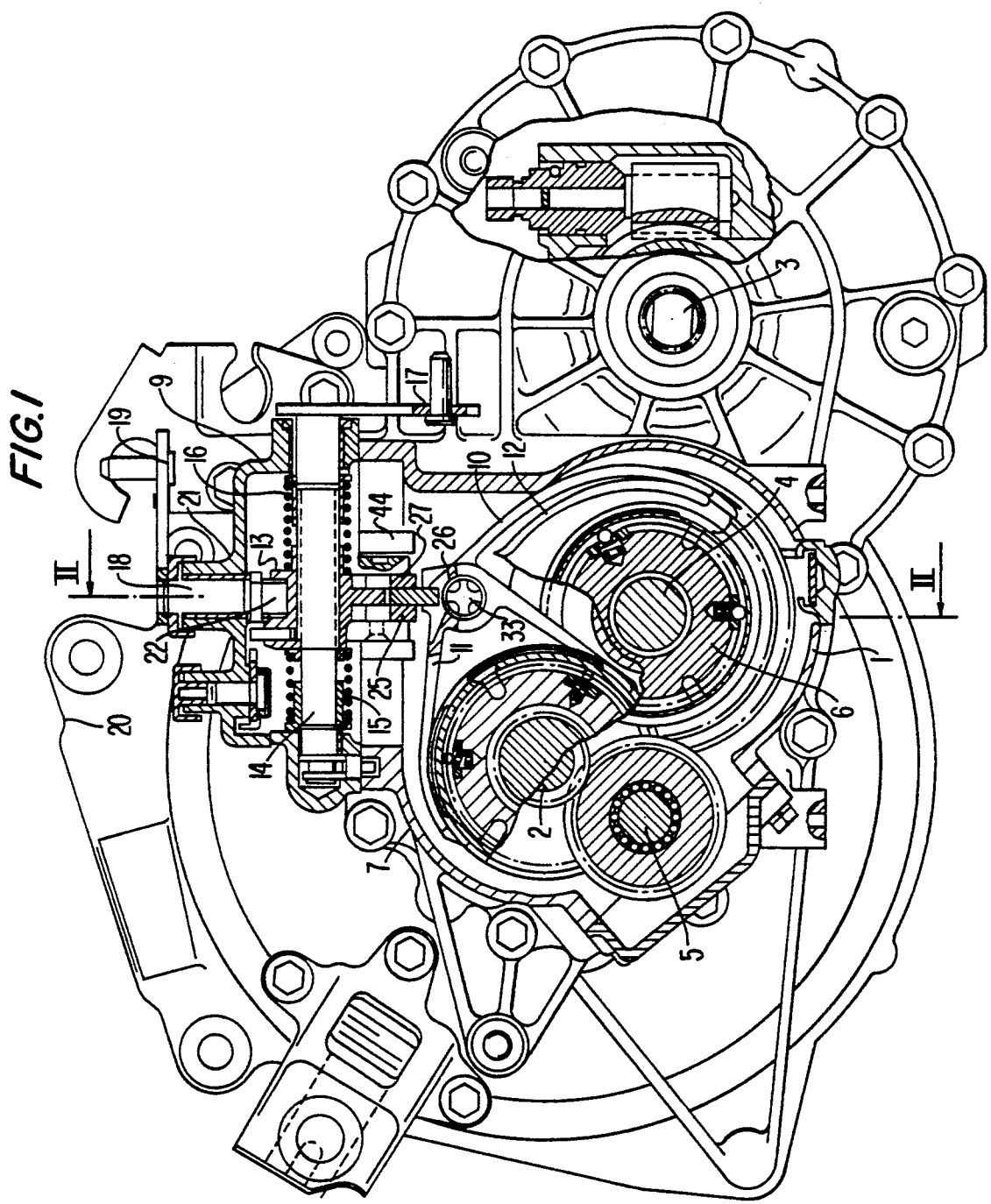
FIG. 1 is a cross-sectional view of a shifting arrangement for a 5-speed gearbox.
Figure 2:
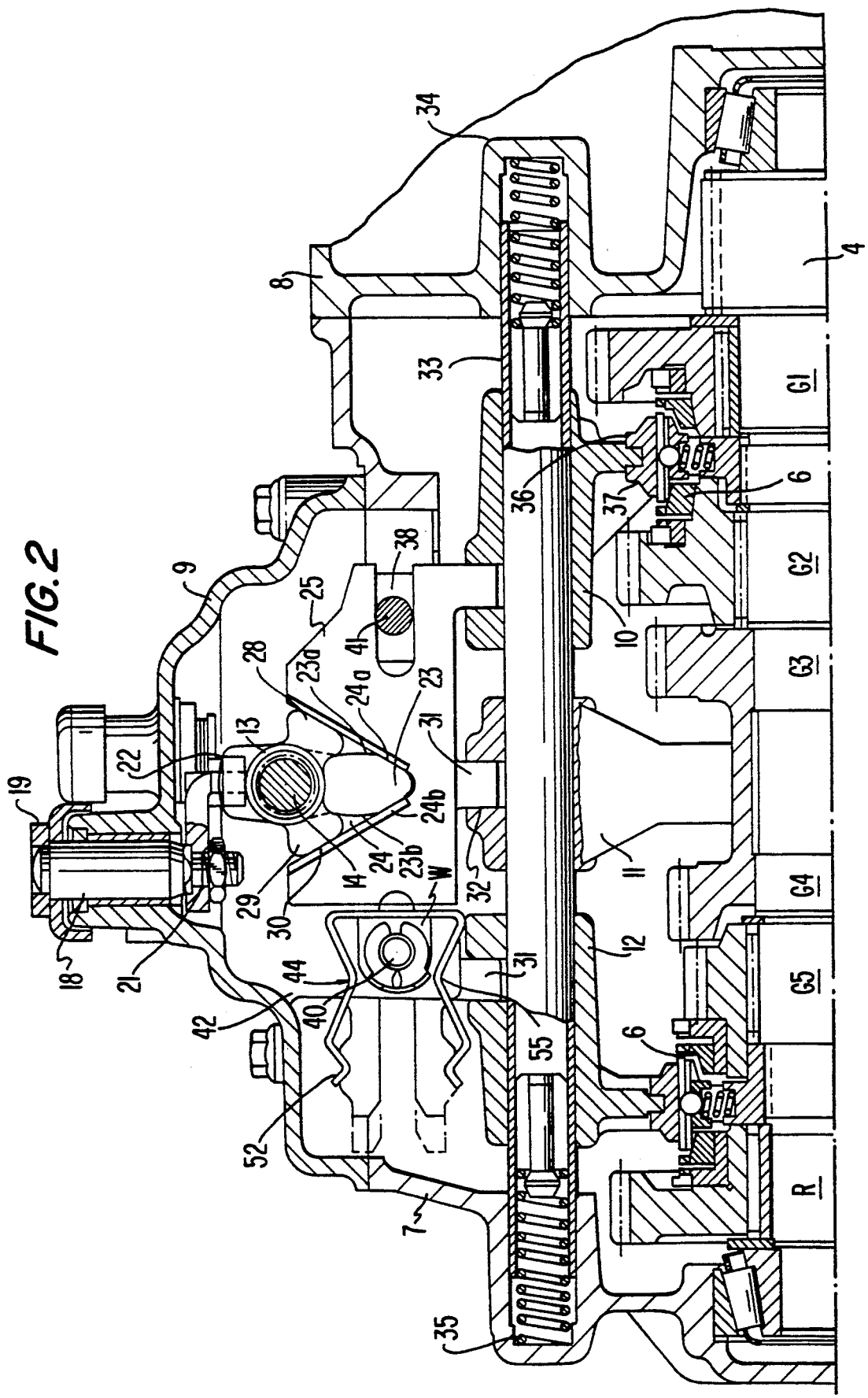
FIG. 2 is a longitudinal sectional view of the shifting arrangement according to Line II—II of FIG. 1.

In a gearbox 1 of a motor vehicle, there are disposed in an operational manner parallel to each other a drive shaft 2, an output shaft 4 driving the front axle 3 of the motor vehicle and an intermediate shaft 5 for a reverse gear R. The gearbox gears G1, G2, G3, G4 and G5 each comprise a fixed wheel and a loose wheel mating with this fixed wheel and, along with the reverse gear R, the listed sequence, as shown in FIG. 2, are arranged on the drive shaft 2 and the output shaft 4. The gears can be connected with the shafts 2, 4 by synchronizer clutches 6.

An upper area of a shift control housing 7 is cast to the gearbox 1 and, together with the gearbox 1, is closed by a front-side bearing cover 8. A lid 9 is screwed or bolted on the shift control housing 7 which is open on top. The lid 9 covers the entire actuating arrangement for the shift forks 10, 11 and 12 engaging in the sliding sleeves of the synchronizer clutches 6. A shifting piece 13 is used as a central member of the actuating arrangement which, in a torque-transmitting manner, is connected with a shifting shaft 14 by a serrated coupling. For the preselection of the gears, the shifting piece 13 can be longitudinally displaced on the shifting shaft 14 against the force of a coil spring 15 biasing it on the left and of a coil spring 16 biasing it from the right. The shifting shaft 14, via a lever 17 mounted at the front side, is linked to a Bowden cable (not shown) leading to a gear shift lever. The preselecting movement is carried out by a preselector shaft 18 disposed perpendicular to the shifting shaft 14 in the lid 9 and, by means of a front-side lever 19 at one end of the shaft 18, is linked to a Bowden cable which is also connected with the gear shift lever.

At the other end of the preselector shaft 18, a selector lever 21 is carried which, through a bearing 22, engages in the top side of the shifting piece 13. A shift finger 23 is diametrically opposite the bearing 22 and is cast to the tube hub of the shifting piece 13. The shift finger 23 is insertable in continuous V-recesses 24 of three shift rails 25, 26, 27 which abut one another. Two radially projecting stop cams 28, 29 are mounted to the shifting piece 13 perpendicular and axially offset with respect to the shift finger 23. The cams 28, 29 form a cross together with the center plane of the shifting piece 13 extending through the shift finger 23 and the bearing 22. The outer contour 30 of the stop cams 28, 29 has a circular-arc-shape and can be introduced into the V-recesses 24 of the shift rails 25, 26, 27. In the longitudinal direction of the shifting piece 13, the stop cams 28, 29 are arranged with respect to the shift finger 23 in such a manner that, when the shift finger 23 engages in the V-recess 24 of the one shift rail 25, the stop cams 28, 29 engage in the V-recesses 24 of the two other shift rails 26, 27 and lock them in a non-displaceable manner.

Each of the three shift rails 25, 26, 27 carries a shift nose 31 on each bottom side, the shift nose 31 of the center shift rail 26 engaging in a recess 32 of the center shift fork 11. The shift noses 31 of the left and the right shift rails 25, 27 engage in the left shift fork 12 and the right shift fork 10, respectively.

The shift forks 10, 11, 12 are longitudinally movably guided on a guiding tube 33 which is parallel to the output shaft 4. The guiding tube 33 is disposed in the shift control housing 7 and is longitudinally movably supported with respect to the housing 7 by springs 34 and 35 on both sides in order to avoid a jamming of the shift forks 10, 11, 12. The fork portions of the shift forks 10, 11, 12 engage in ring-shaped recesses of sliding sleeves 37 actuating the synchronizer clutches 6.

Both sides of the shift rails 25, 26, 27 have slots 38, 39 which extend parallel to the guiding tube 33. Pins 40, 41 are fitted into the slots and are fastened in ribs 42, 43 of the lid 9.

Figure 3:
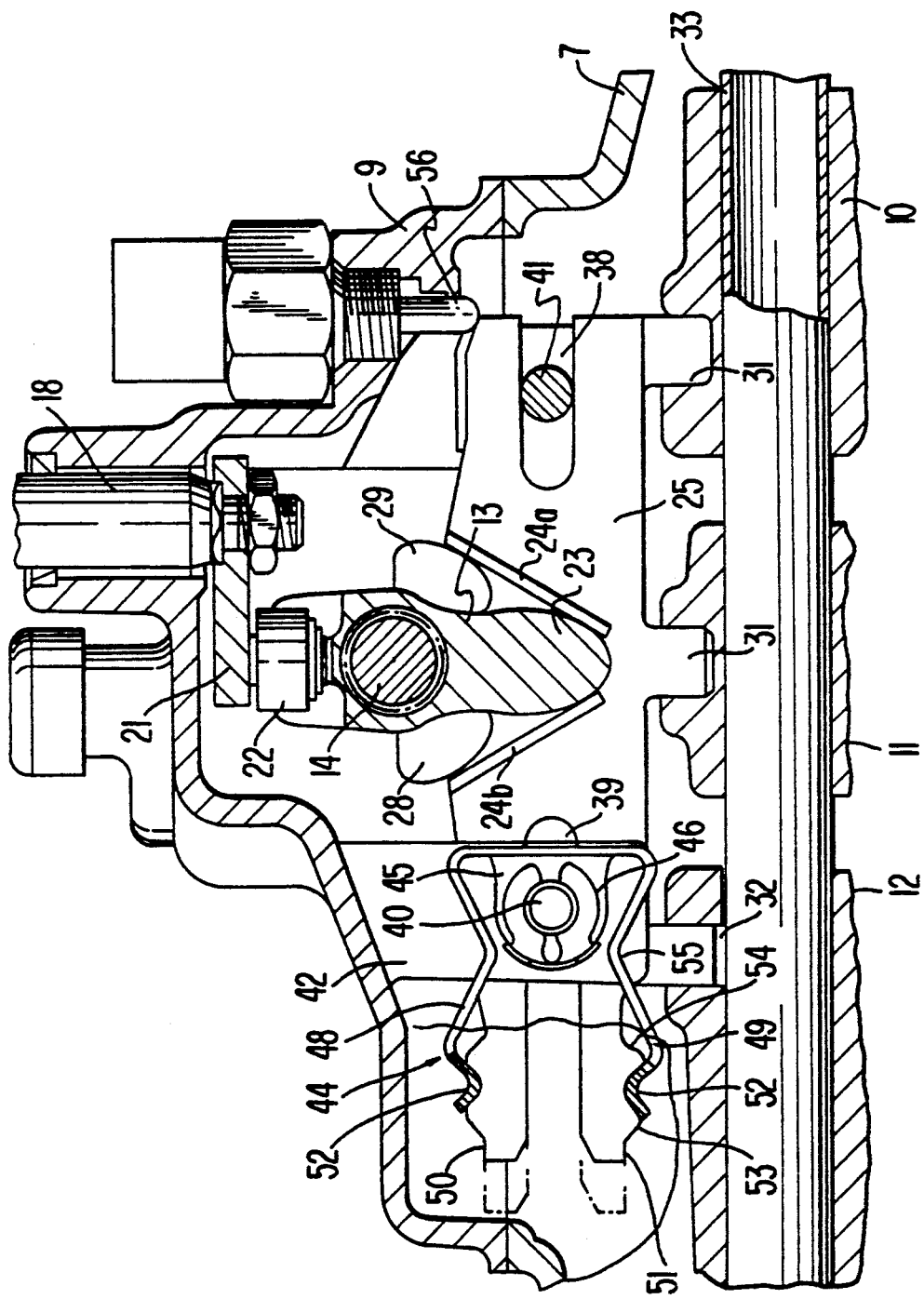
FIG. 3 is an enlarged portion of the longitudinal sectional view of FIG. 2.
Figure 4:
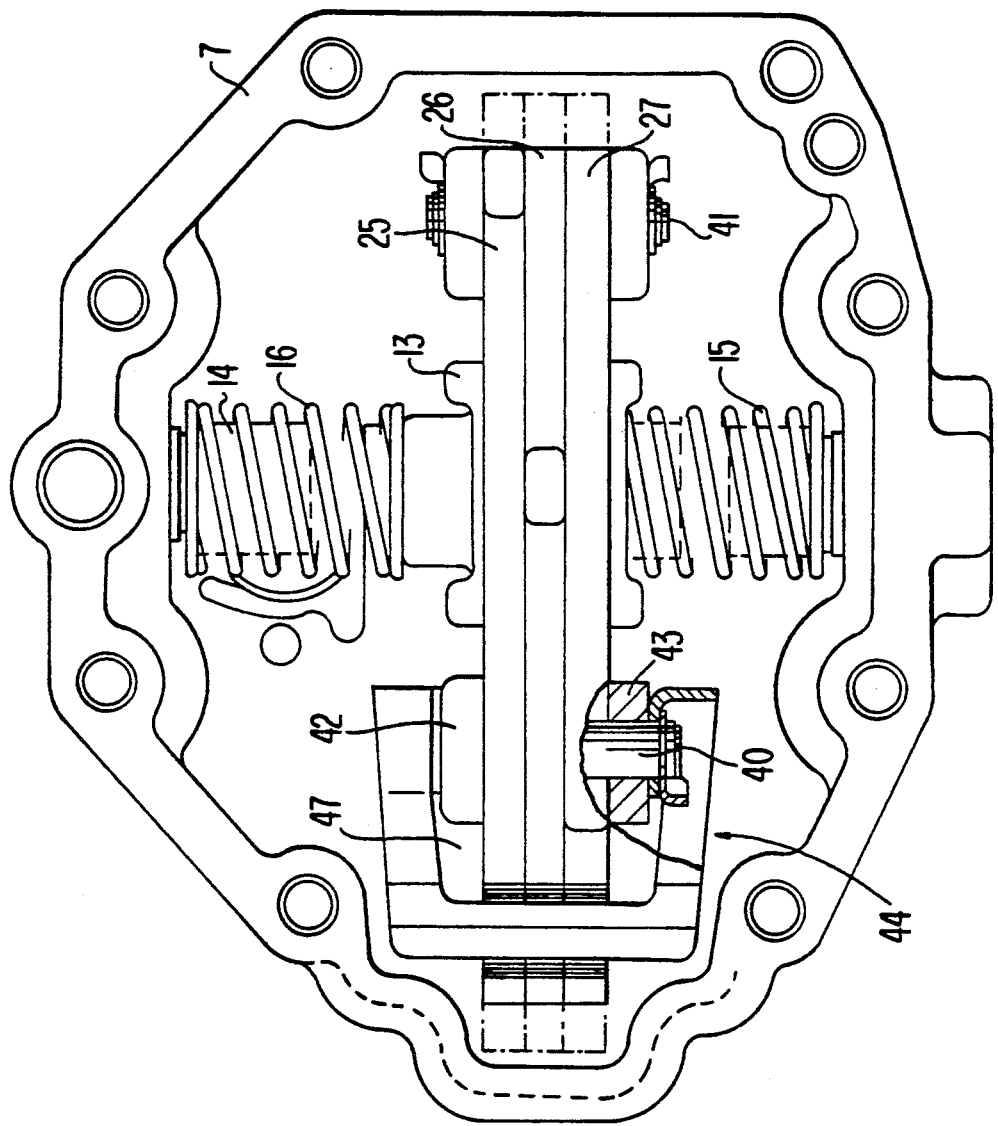
FIG. 4 is a top view of the enlarged portion shown in FIG. 3 but with the lid removed.

A U-shaped spring 44 having spring claws 45, 46 mounted in the web area W is fastened to pin 40. The shift rails 25, 26, 27 are disposed in a center U-cutout 47 of the spring 44 cut in from the web side. The U-legs 48, 49 of the spring 44, in a tong-like manner, reach around the shift rails 25, 26, 27 on their top sides 50 and 51. Beads 52 on the legs 48, 49 in the illustrated position, lock in center indentations of the shift rails 25, 26, 27 which are formed between two cam elevations 53, 54 as shown in FIG. 3. The U-legs can also be provided with bent-in portions 55 for reinforcement.

When a shift rail is moved into a left shifting position as viewed in the leftward direction of FIG. 2 (as shown by the dotted lines), the beads 52 are lifted out of the center indentation, sweep over the dome of the right cam elevation 54 of the moving shift rail and then place themselves elastically on its right flank. The shifting operation to the right side takes place similarly with the beads 52 placing themselves on the left flank of left cam elevation 53. While one shift rail is shifted to the left or right, the beads 52 lift off the non-shifted shift rails. However, these non-shifted shift rails are locked into their center zero position by the fact that the stop cams 28, 29 slide along the V-recesses 24 during the entire shifting operation and thus hold the non-shifted shift rails in a non-displaceable manner. A shift contact 56 actuated by the shift rails 25, 26, 27 is used for detecting and remote-transmitting of the shift position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for a motor vehicle synchronized gear wheel change box, having individual gear speeds, comprising a rotatable preselector shaft, a selector lever operatively associated with the shaft, synchornizer clutches for the individual gear speeds, shift forks assigned to the individual gear speeds and operatively engaging the synchronizer clutches, a shifting piece operatively connected with the selector lever so as to be longitudinally slidable on and non-rotatably associated with a rotatable shifting shaft for the preselecting and shifting of the shift forks assigned to the individual gear speeds via a shift finger mounted at the shifting piece which operatively cooperates with a plurality of abutting shift rails in such a manner that one of the shift rails is moved and the remaining shift rails are locked, and a spring which effects the rocking of a respective shifting position of the remaining shift rails, wherein the spring form-fittingly and elastically parallel engages in the shift rails and is held in a non-displaceable manner relative to the gearbox, wherein the spring has, as viewed along a longitudinal direction of the shift rails, a U-shaped cross-section with legs and beads formed at both legs, which beads are adopted to engage in correspondingly shaped indentations at a top side and a bottom side of the shift rails.

2. The shifting arrangment according to claim 1, wherein the spring, as viewed in a transverse direction of the shift rials, has a U-shaped center section in which the shift rails are arranged.

3. The shifting arrangement according to claim 2, wherein a web area of the spring is fastened to a pin fixed at the gearbox at which the shift rails are longitudinally guided parallel to a guiding tube for the shift forks fixed at the gearbox.

4. The shifting arrangement according to claim 1, wherein each of the shift rails has two cam elevations on the top side and the bottom side with the beads of the legs elastically resting against the cam elevations and thus determining a left, a central and a right shifting position of the shift rails.

5. The shifting arrangement according to claim 4, wherein a web area of the spring is fastened to a pin fixed at the gearbox at which the shift rails are longitudinally guided parallel to a guiding tube for the shift forks fixed at the gearbox.

6. The shifting arrangement according to claim 5, wherein the spring, as viewed in a transverse direction of the shift rails, has a U-shaped center section in which the shift rails are arranged.

7. A shifting arrangement for a motor vehicle synchronized gear wheel change box, having individual gear speeds, comprising a rotatable preselector shaft, a selector lever operatively associated with the shaft, synchornizer clutches for the individual gear speeds, shift forks assigned to the individual gear speeds and operatively engaging the synchronizer clutches, a shifting piece operatively connected with the selector lever so as to be longitudinally slidable on and non-rotatably associated with a rotatable shifting shaft for the preselecting and shifting of the shift forks assigned to the individual gear speeds via a shift finger mounted at the shifting piece which operatively cooperates with a plurality of abutting shift rails in such a manner that one of the shift rails is moved and the remaining shift rails are locked, and a spring which effects the rocking of a respective shifting position of the remaining shift rails, wherein the spring form-fittingly and elastically parallel engages in the shift rails and is held in a non-displaceable manner relative to the gearbox and transversely across the shifting rails wherein a web area of the spring is fastened to a pin fixed at the gearbox at which the shift rails are longitudinally guided parallel to a guiding tube for the shift forks fixed at the gearbox.

8. The shifting arrangement according to claim 7, wherein the spring has a U-shaped cross-section with legs and beads formed at both legs, which beads are adopted to engage in correspondingly shaped indentations at a top side and a bottom side of the shift rails.

9. A shifting arrangement for a motor vehicle synchronized gear wheel change box, having individual gear speeds, comprising a rotatable preselector shaft, a selector lever, operatively associated with the shaft, synchronizer clutches for the individual gear speeds, shift forks assigned to the individual gear speeds and operatively engaging the synchronizer clutches, a shifting piece operatively connected with the selector lever so as to be longitudinally slidable on and non-rotatably associated with a rotatable shifting shaft for the preselecting and shifting of the shift forks assigned to the individual gear speeds via a shift finger mounted at the shifting piece which operatively cooperates with a plurality of abutting shift rails in such a manner that one of the shift rails is moved and the remaining shift rails are locked, a spring effects the rocking of a respective shifting position of the remaining shift rails, wherein the spring form-fittingly and elastically engages in the shift rails and is held in a non-displaceable manner relative to the gearbox, and the plurality of abutting shift rails comprising three shift rails for the shifting of five forward gears and one reverse gear of said gear speeds, wherein the spring has a U-shaped cross-section with a top and a bottom legs being parallel to said shifting rails and beads formed at both legs, which beads are adopted to engage in correspondingly shaped indentations at a top side and a bottom side of the shift rails.

10. The shifting arrangement according to claim 9, wherein a web area of the spring is fastened to a pin fixed at the gearbox at which the shift rails are longitudinally guided parallel to a guiding tube for the shift forks fixed at the gearbox.

11. The shifting arrangement according to claim 10, wherein the spring, as viewed in a transverse direction of the shift rails, has a U-shaped center section in which the shift rails are arranged.

12. The shifting arrangement according to claim 11, wherein each of the shift rails has two cam elevations on the top side and the bottom side with the beads of the legs elastically resting against the cam elevations and thus determining a left, a central and a right shifting position of the shift rails.

13. A shifting arrangement for a motor vehicle synchronized gear wheel change box, having individual gear speeds, comprising a rotatable preselector shaft, a selector lever, operatively associated with the shaft, synchronizer clutches for the individual gear speeds, shift forks assigned to the individual gear speeds and operatively engaging the synchronizer clutches, a shifting piece operatively connected with the selector lever so as to be longitudinally slidable on and non-rotatably associated with a rotatable shifting shaft for the preselecting and shifting of the shift forks assigned to the individual gear speeds via a shift finger mounted at the shifting piece which operatively cooperates with a plurality of abutting shift rails in such a manner that one of the shift rails is moved and the remaining shift rails are locked, a spring effects the rocking of a respectively shifting position of the remaining shift rails, wherein the spring form-fittingly and elastically engages in the shift rails and is held in a non-displaceable manner relative to the gearbox, and the plurality abutting shift rails comprising three shift rails are used for the shifting of five forward gears and one reverse gear, wherein during actuation of one of the shift rails, the two remaining shift rails are locked by circular-arc-shaped stop cams of the shifting piece which slide along V-recesses of the two remaining shift rails, wherein the spring has a U-shaped cross-section with a top and a bottom legs being parallel to said shifting rails and beads formed at both legs, which beads are adopted to engage in correspondingly shaped indentations at a top side and a bottom side of the shift rails.

14. The shifting arrangement according to claim 13, wherein a web area of the spring is fastened to a pin fixed at the gearbox at which the shift rails are longitudinally guided parallel to a guiding tube for the shift forks fixed at the gearbox.

15. The shifting arrangement according to claim 14, wherein the spring, as viewed in a transverse direction of the shift rails, has a U-shaped center section in which the shift rails are arranged.

16. The shifting arrangement according to claim 15, wherein each of the shift rails has two cam elevations on the top side and the bottom side with the beads of the legs elastically resting against the cam elevations and thus determining a left, a central and a right shifting position of the shift rails.

* * * * *